(12) United States Patent
Amores Llopis et al.

(10) Patent No.: US 11,423,248 B2
(45) Date of Patent: Aug. 23, 2022

(54) HIERARCHICAL SAMPLING FOR OBJECT IDENTIFICATION

(71) Applicant: Johnson Controls Tyco IP Holdings LLP, Milwaukee, WI (US)

(72) Inventors: Jaume Amores Llopis, Cork (ES); Young M. Lee, Old Westbury, NY (US); Ian C. Westmacott, Tewksbury, MA (US); Yohay Falik, Petah Tiqwa (IL); Amit Rozner, Yehud (IL)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 104 days.

(21) Appl. No.: 17/061,262

(22) Filed: Oct. 1, 2020

(65) Prior Publication Data

US 2021/0097333 A1 Apr. 1, 2021

Related U.S. Application Data

(60) Provisional application No. 62/908,980, filed on Oct. 1, 2019.

(51) Int. Cl.
*G06K 9/62* (2022.01)
*G06T 7/00* (2017.01)
*G06T 7/246* (2017.01)
*G06V 20/56* (2022.01)
*G06V 40/10* (2022.01)

(52) U.S. Cl.
CPC ......... *G06K 9/6215* (2013.01); *G06K 9/6251* (2013.01); *G06T 7/246* (2017.01); *G06V 20/56* (2022.01); *G06V 40/103* (2022.01); *G06T 2207/20084* (2013.01)

(58) Field of Classification Search
None
See application file for complete search history.

(56) References Cited

U.S. PATENT DOCUMENTS 9,204,112 B2 * 12/2015 Pasteris .................. G06V 10/40

OTHER PUBLICATIONS

Lovric Miodrag: "International Encyclopedia of Statistical Science"; Jan. 1, 2011, Springer.
Blanken Henk: "Multimedia Retrieval" Jan. 1, 2007, Springer, pp. 353-355.

(Continued)

*Primary Examiner* — Matthew C Bella
*Assistant Examiner* — Brian D Shin
(74) *Attorney, Agent, or Firm* — ArentFox Schiff LLP

(57) ABSTRACT

Aspects of the present disclosure include methods, systems, and non-transitory computer readable media that perform the steps of receiving a first plurality of snapshots, generating a first plurality of descriptors each associated with the first plurality of snapshots, grouping the first plurality of snapshots into at least one cluster based on the plurality of descriptors, selecting a representative snapshot for each of the at least one cluster, generating at least one second descriptor for the representative snapshot for each of the at least one cluster, wherein the at least one second descriptor is more complex than the first plurality of descriptors, and identifying a target by applying the at least second descriptor to a second plurality of snapshots.

20 Claims, 5 Drawing Sheets

(56) References Cited

OTHER PUBLICATIONS

Amiri et al.,"Hierachical Keyframe-based Video Summarization using QR-Decomposition and Modified K-Means Clustering" Eurasip Journal on Advances In Signal Processing, Nov. 2, 2010, vol. 2010, No. 1, pp. 1-16.
Extended European Search for European Application No. 20199642.8-1207 dated Feb. 24, 2021.

* cited by examiner

HIERARCHICAL SAMPLING FOR OBJECT IDENTIFICATION

The current application claims the benefit of U.S. Provisional Application No. 62/908,980, entitled "HIERARCHICAL SAMPLING FOR OBJECT IDENTIFICATION," filed on Oct. 1, 2019, the contents of which are incorporated by reference in their entireties.

BACKGROUND

In surveillance systems, numerous images (e.g., more than thousands or even millions) may be captured by multiple cameras. Each image may show people and objects (e.g., cars, infrastructures, accessories, etc.). In certain circumstances, security personnel monitoring the surveillance systems may want to locate and/or track a particular person and/or object through the multiple cameras. However, it may be computationally intensive for the surveillance systems to accurately track the particular person and/or object by searching through the images. Therefore, improvements may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

An aspect of the present disclosure includes a method including receiving a first plurality of snapshots, generating a first plurality of descriptors each associated with the first plurality of snapshots, grouping the first plurality of snapshots into at least one cluster based on the plurality of descriptors, selecting a representative snapshot for each of the at least one cluster, generating at least one second descriptor for the representative snapshot for each of the at least one cluster, wherein the at least one second descriptor is more complex than the first plurality of descriptors, and identifying a target by applying the at least second descriptor to a second plurality of snapshots.

Aspects of the present disclosure includes a system having a memory that stores instructions and a processor configured to execute the instructions to receive a first plurality of snapshots, generate a first plurality of descriptors each associated with the first plurality of snapshots, group the first plurality of snapshots into at least one cluster based on the plurality of descriptors, select a representative snapshot for each of the at least one cluster, generate at least one second descriptor for the representative snapshot for each of the at least one cluster, wherein the at least one second descriptor is more complex than the first plurality of descriptors, and identify a target by applying the at least second descriptor to a second plurality of snapshots.

Certain aspects of the present disclosure includes a non-transitory computer readable medium having instructions stored therein that, when executed by a processor, cause the processor to receive a first plurality of snapshots, generate a first plurality of descriptors each associated with the first plurality of snapshots, group the first plurality of snapshots into at least one cluster based on the plurality of descriptors, select a representative snapshot for each of the at least one cluster, generate at least one second descriptor for the representative snapshot for each of the at least one cluster, wherein the at least one second descriptor is more complex than the first plurality of descriptors, and identify a target by applying the at least second descriptor to a second plurality of snapshots.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

Figure 1:
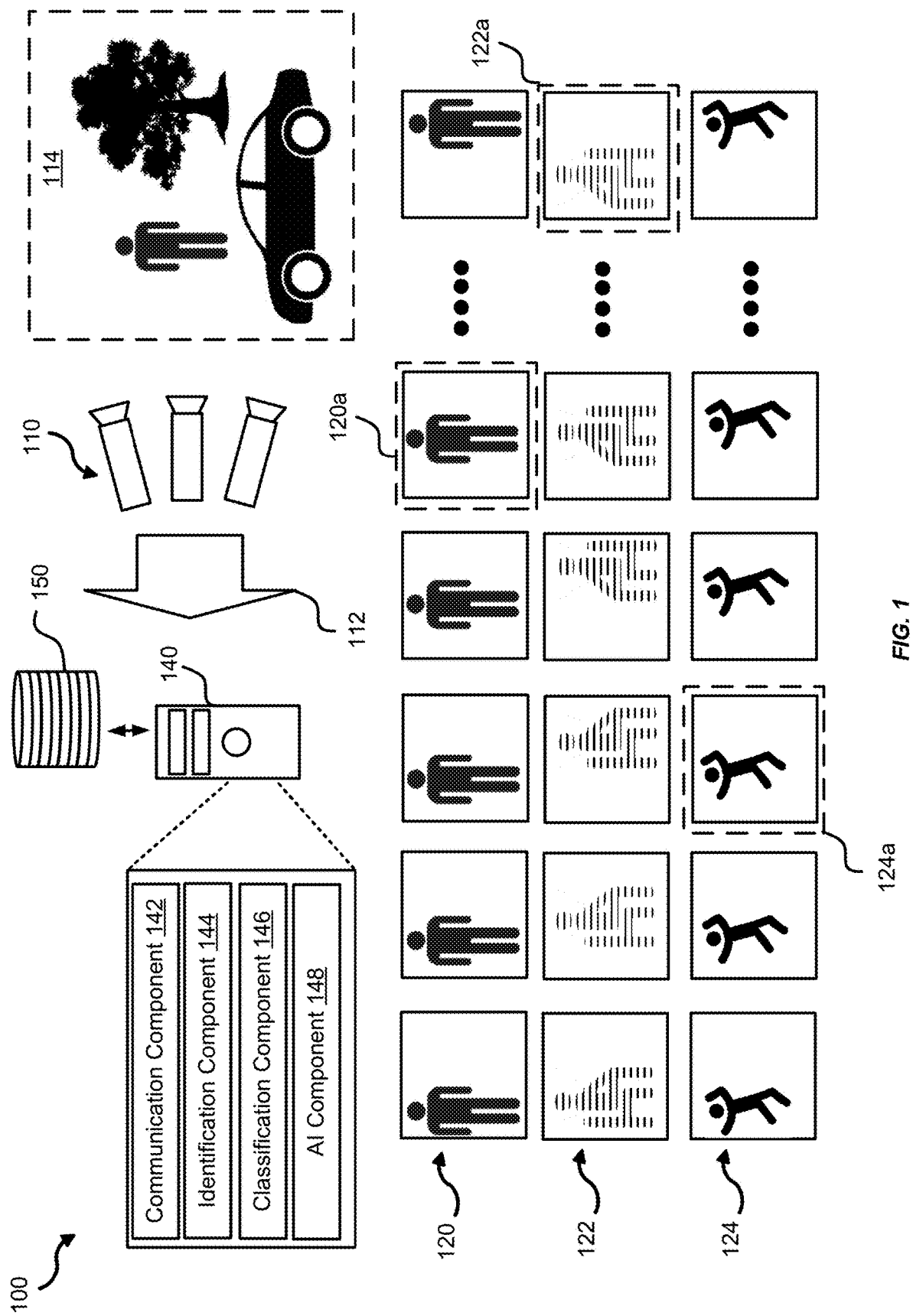
FIG. 1 illustrates an example of an environment for implementing the hierarchical sampling for re-identification process in accordance with aspects of the present disclosure.

The following includes definitions of selected terms employed herein. The definitions include various examples and/or forms of components that fall within the scope of a term and that may be used for implementation. The examples are not intended to be limiting.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The input to the hierarchical sampling re-identification system is a set of object tracks, where each track is a sequence of snapshots captured across consecutive frames of the video stream. Given this input, the re-identification system may extract meta-data in the form of descriptors (also called visual features), which are arrays of numbers representing the visual appearance of the object in each track. A typical approach for is to extract a descriptor for each snapshot in the track, and store either all the descriptors or an aggregated descriptor (e.g., using average or max pooling) in the database. The resulting collection of descriptors provides the necessary meta-data to later perform re-identification. Typically, highly complex descriptors leading to accurate re-identification tend to have higher computational costs, while less complex descriptors tend to have lower computational cost, at the expense of providing lower re-identification accuracy.

If there are N snapshots in the track, the system extracts one descriptor per snapshot, and the extraction cost per descriptor is C, then the total cost for the track is T=C*N. In order to reduce this cost, the system can extract descriptors from only M snapshots in the track, where M«N. In some instances, the higher the number of descriptors M, the more complete the description of the whole track, and the higher the accuracy of the subsequent re-identification.

One aspect of the present disclosure includes how the system samples the best M snapshots that, combined, provide the most complete description of the object track. In general, the ideal sampling process first clusters the snapshots in such a way that those with similar characteristics fall in the same cluster, and then picks a single representative snapshot per cluster, avoiding to extract descriptors from redundant snapshots in the same cluster.

Clustering may rely on a similarity function that accurately compares the key visual appearance properties of snapshots, in order to put the ones with same properties in the same cluster. Such similarity function may be obtained by comparing the descriptors among snapshots, where each descriptor summarizes the key visual properties of its corresponding snapshot.

An aspect of the present disclosure includes a system that extracts lower complexity descriptors for clustering, and then extracts higher-level complexity descriptors only from one snapshot per cluster.

Let $C_L$ be the computational cost corresponding to the low-level complexity descriptor (measured as processing time in seconds that it takes to extract the descriptor for one snapshot), let $C_H$ be the computational cost corresponding to the high-complexity descriptor, let N be the total number of snapshots in the current object track, let K be the number of samples we pick after clustering, and let $C_C$ be the cost of clustering. The total cost for the pipeline for a two level hierarchical sampling is:

$$C_T = N*C_L + C_C + K*C_H$$

A generalization of the previous strategy may be obtained by adding intermediate layers of complexity. The lower complexity descriptor $C_0$ may be applied to all the snapshots. Next, the system extracts descriptors of intermediate complexity and discriminative power. As the intermediate layer is more discriminative than the lower layer, using the descriptors of intermediate complexity allows the system to further reduce the number of selected snapshots. Finally, the system extract the highest complexity descriptors from this reduced set of $K_1$ snapshots.

Another example of sampling component that can be used to replace some of the layers of the pipeline is based on video segmentation. This sampling works by first detecting changes across frames, then segmenting the video into pieces of relatively constant content, and finally selecting a single snapshot for each segment. Typically, the higher the complexity of the segmentation algorithm, the better the selection of snapshots, at the cost of a higher computational cost, leading again to the same ideas exposed previously, and therefore allowing a similar hierarchical (multi-level) strategy.

As described in the previous paragraph, sampling layers of different complexity can be obtained by extracting not only descriptors of different complexity, but also other types of metadata. Examples of this are the number of the frame where the snapshot is found, the spatial coordinates of the object in the frame, or the size of the object in pixels. For example, using the last two types of metadata, the system may cluster the snapshots by spatial position and size, so that snapshots that haven't moved much fall into the same cluster.

In some instances, the pipeline may include an additional component which is a classifier. This component provides the class of object being described. Based on that, a class-specific descriptor can be extracted. For example, the system first utilizes the hierarchical sampling as described in previous sections up to level L-1. As a result of this process, the system may obtain a reduced number of sampled object image snapshots. For example, if the original process included only 3 levels of complexity, then the system may apply level 0 and level 1, and may obtain $K_1$ snapshots as a result of last level. In general, the system will obtain $K_{L-1}$ snapshots after L-1 levels. Then, the system may either apply the classification component to all these $K_{L-1}$ sampled snapshots, or just apply it to a smaller subset of K' snapshots (e.g., by using clustering again). A single classification decision is obtained by aggregating (e.g., averaging) the classification score obtained for each of the K' snapshots and selecting the class whose aggregated score is maximum. Once the class has been determined, class-specific descriptors can be extracted from each of the K samples, in order to reduce the computational cost.

Many methods of clustering exist, including K-means, DBSCAN, Gaussian Mixture Models, Mean-Shift, and others. Also, different distances can be used, including Euclidean, Cosine distance, Mahalanobis, Geodesic distance and others. Another clustering type is online clustering.

In another implementation, the system may select the next best snapshot that has the highest quality in terms of re-identification. For example, some snapshots will have higher quality because the object has better illumination, and therefore the details can be seen and described better. Also, the alignment of the object in the snapshot is used for re-identification, as a bad aligned snapshot will be visually dissimilar to other snapshots corresponding to the same object.

In order to measure the quality of the snapshot for re-identification purposes, the system may measure the Mean Average Precision (MAP) of a snapshot. Snapshots with lower quality will tend to be more often confused with snapshots from other objects, since the details are not so clear. On the other hand, snapshots with higher quality will tend to have a more clear separation to snapshots from other objects, and this can be measured by the MAP metric.

In order to avoid having to compute this MAP metric based on actual comparisons with a gallery of snapshots in the database, the system may use regression as a fast proxy. The idea is to train a "regression model" that is able to estimate the MAP by looking at the snapshot. A typical regression model is obtained by Neural Networks (NN). Because NN are also used to extract descriptors of high quality, the system may train a single network that provides both an estimated MAP score and a descriptor.

In order to avoid selecting multiple snapshots having similar MAP scores, after one snapshot is selected, the system may need to avoid considering all the snapshots whose similarity is higher than some pre-specified threshold. Using neural networks is just one possibility, as there are other regressors that can be used. The hierarchy comes from the fact that the first levels use fast and less accurate regressors which usually provide sub-optimal MAP estimation, so that we need to obtain more samples to compensate, while last levels obtain better MAP estimates which allows to narrow down the selection to fewer snapshots.

Referring to FIG. 1, an example of an environment 100 for performing hierarchical sampling for object re-identification may include a server 140 that receives surveillance videos and/or images 112 from a plurality of cameras 110. The plurality of cameras 110 may capture the surveillance videos and/or images 112 of one or more locations 114 that include people and/or objects (e.g., cars, bags, etc.).

In certain instances, the server 140 may include a communication component 142 that receives and/or sends data (such as the captured surveillance videos and/or images 112) from and to other devices, such as a data repository 150. The server 140 may include an identification component 144 that performs the hierarchical sampling process for object re-identification. The server 140 may include a classification component 146 that classifies one or more images or objects in the images. The server 140 may include an artificial intelligence (AI) component 148 that performs AI operations during the re-identification process.

In some implementations, the captured surveillance videos and/or images may include snapshots (i.e., frames or portions of frames). For example a one minute surveillance video and/or images may include 30, 60, 120, 180, 240, or other numbers of snapshots. During the hierarchical sampling process, the communication component 142 may receive the surveillance video and/or images 112 from the plurality of cameras 110. The identification component 144 may perform the hierarchical sampling process for re-identification. The classification component 146 may classify an image or objects of the image. The AI component 148 may perform filtering and/or representative snapshot selection process.

In certain aspects, the communication component 142 of the server 140 may receive the surveillance video and/or images 112. The server 140 may generate and apply a first set of descriptors of low complexity (such as color, lighting, shape, etc) relating to a person or object to be identified in the surveillance video and/or images 112. The application of the first set of descriptors to the surveillance video and/or images 112 may cause the server 140 to group the snapshots of the person or object to be identified in the surveillance video and/or images 112 into separate clusters. For example, by using a shape descriptor (shape of people or objects), the server 140 may obtain three clusters: a first cluster 120 (e.g., snapshots with varying standing postures of the person), a second cluster 122 (e.g., snapshots with varying sitting postures of the person), and a third cluster 124 (e.g., snapshots with varying jumping postures of the person).

Next, in some instances, the server 140 may identify a representative snapshot 120a, 122a, 124a (described in further detail below) from each of the first, second, and third clusters 120, 122, 124. The representative snapshots 120a, 122a, 124a may include the least number of background objects, having the most clear contrast, having the best lighting, showing certain desired features, etc.

Next, in some examples, the server 140 may generate a second set of descriptors based on the representative snapshots 120a, 122a, 124a. The second set of descriptors may include more complexity than the first set of descriptors (e.g., including spatial information, timing information, class information, etc.).

In certain implementations, the server 140 may apply the second set of descriptors to the surveillance video and/or images 112 to identify and/or locate a target, such as the person or object to be identified.

Figure 2:
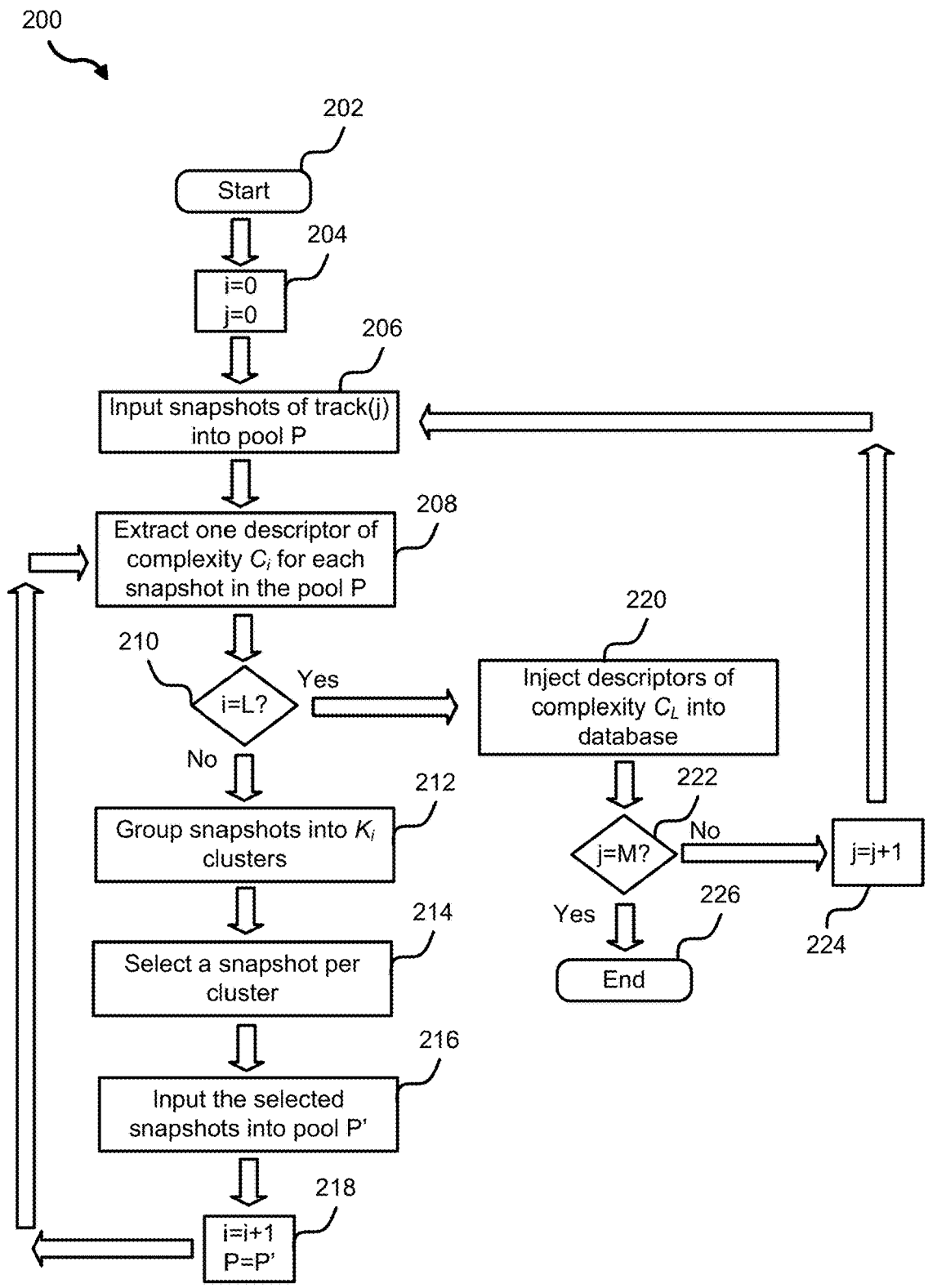
FIG. 2 illustrates an example of a method for implementing the hierarchical sampling for re-identification process in accordance with aspects of the present disclosure.

Turning to FIG. 2, an example of a method 200 for performing hierarchical sampling for re-identification may be performed by the server 140 and one or more of the communication component 142 and/or the identification component 144.

At block 202, the method 200 may start the hierarchical sampling for a re-identification process.

At block 204, the method 200 may set the counters i and j to 0. The counter i may represent the number of iterations of selecting descriptors and clustering snapshots. The counter j may represent the number of tracks (e.g., groups of videos and/or images). For example, the identification component 144 of the server 140 receiving surveillance videos and/or image from nine cameras of the plurality of cameras 110 may have a j value of "9" (1 track from each camera).

At block 206, the method 200 may input snapshots of track (i) into a pool P. For example, the identification component 144 may input a portion of the surveillance videos and/or images 112 into a pool P.

At block 208, the method 200 may generate a descriptor of complexity $C_i$ for each snapshot in the pool P. The descriptor of complexity $C_0$ may have lower complexity than the descriptor of complexity $C_1$, the descriptor of complexity $C_1$ may have lower complexity than the descriptor of complexity $C_2$, and so forth and so on.

At block 210, the method 200 may determine if i=L, where L is the number of levels of complexities. If the identification component 144 of the server 140 determines that i<L, then the identification component 144 may move onto block 212.

At block 212, the method 200 may group snapshots into $K_i$ clusters. For example, the identification component 144 of the server 140 may group the surveillance videos and/or images 112 into three clusters: the first, second, and third clusters 120, 122, 124.

At block 214, the method 200 may select a snapshot per cluster. For example, the identification component 144 of the server 140 may select the snapshots 120a, 122a, 124a for each of the first, second, and third clusters 120, 122, 124.

At block 216, the method 200 may input the selected snapshots into a pool P'. For example, the identification component 144 may input the snapshots 120a, 122a, 124a into the pool P'.

At block 218, the method 200 may increment the counter i by one and set the pool P to be equal to the pool P'. For example, the identification component 144 may increment the counter i and set the pool P to P'.

In some implementations, the method 200 may iteratively perform some or all of the steps between blocks 208 and 218 until, at block 210, the identification component 144 of the server 140 determines that i=L. If the identification component 144 of the server 140 determines that i=L, then the identification component 144 may move onto block 220.

At block 220, the method 200 may inject the descriptors of complexity CL into a database, such as the data repository 150. For example, the identification component 144 may apply the descriptors of complexity $C_L$ (e.g., $C_1$ for 1 level, $C_2$ for 2 levels, etc.) on the surveillance videos and/or images 112 in the server 140 or the data repository 150.

At block 222, the method 200 may determine if j=M, where M is the number of tracks. If the identification component 144 of the server 140 determines that j<M, then the identification component 144 may move onto block 224.

At block 224, the method 200 may increment the counter j by 1. For example, the identification component 144 may increment the counter j by 1.

In some implementations, the method 200 may iteratively perform some or all of the steps between blocks 208 and 222 until, at block 222, the identification component 144 of the server 140 determines that j=M. If the identification component 144 of the server 140 determines that j=M, then the identification component 144 may move onto block 226 to terminate the method 200.

Figure 3:
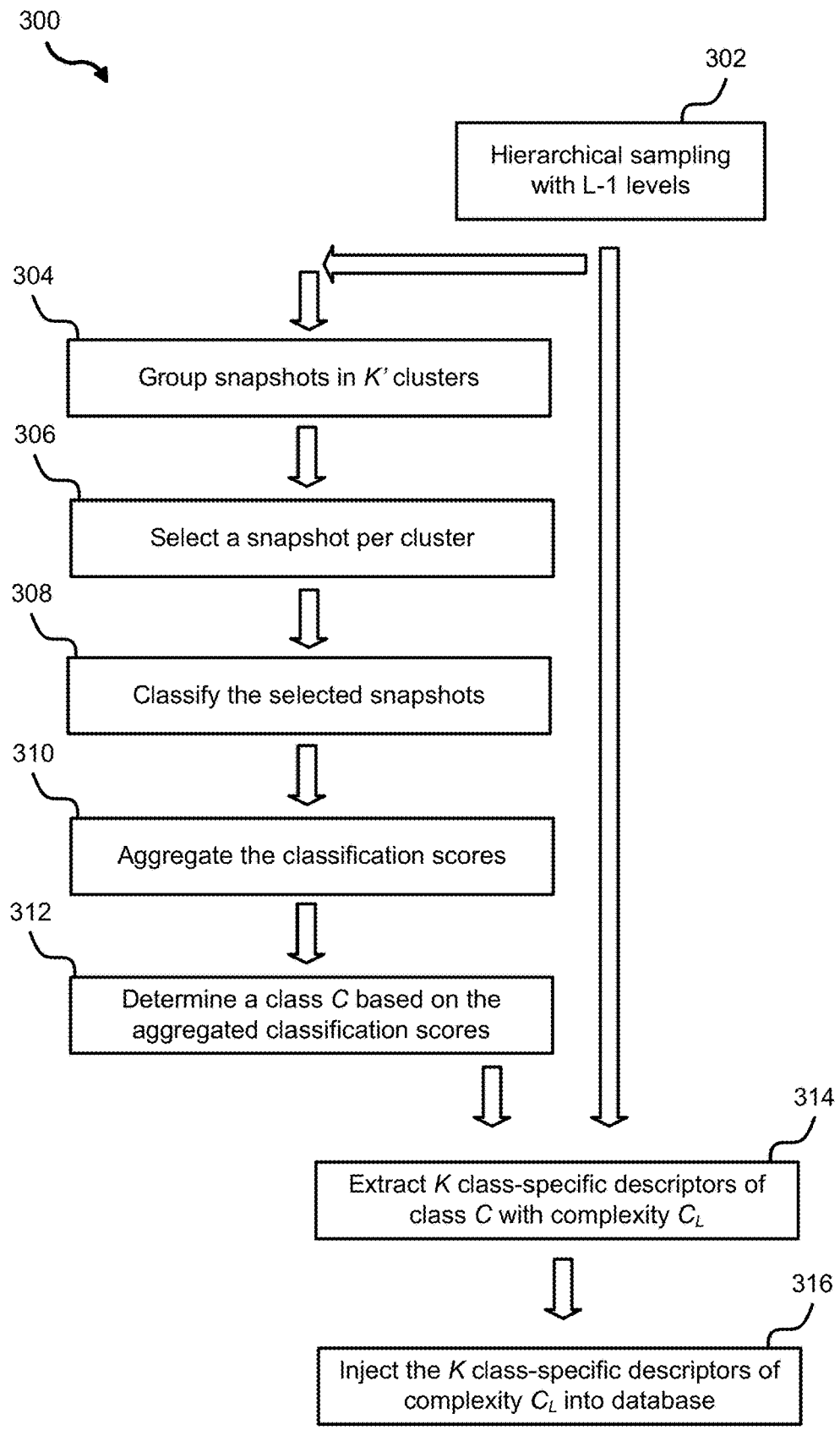
FIG. 3 illustrates an example of a method for implementing the hierarchical sampling for re-identification process including classification in accordance with aspects of the present disclosure.

Turning now to FIG. 3, an example of a method 300 for performing hierarchical sampling for re-identification including classification may be performed by the server 140 and one or more of the communication component 142, the identification component 144, the classification component 146 and/or the AI component 148.

At block 302, the method 300 may perform a hierarchical sampling process for re-identification (with or without classification) for L-1 levels as described above.

At block 304, the method 300 may group snapshots in K' clusters as described above.

At block 306, the method 300 may select a snapshot per cluster. For example, the identification component 144 may select K' snapshots for the K' cluster based on the quality of the snapshot as described above.

At block 308, the method 300 may classify the selected snapshots. For example, the identification component 144 and/or the classification component 146 may classify the selected snapshots based on one or more classification algorithms as described above. During the classification process, each of the selected snapshot may be assigned a plurality of classification scores associated with a plurality of classes (e.g., person class, car class, building class, object class, etc.). In one non-limiting example, a first snapshot may be assigned classification scores of (car-1, person-5, building-2), and a second snapshot may be assigned classification scores of (car-0, person-4, building-0).

At block 310, the method 300 may aggregation the classification score. For example, the identification component 144 and/or the classification component 146 may aggregate the corresponding classification scores for the K' snapshots as described above. For example, the aggregated scores for the example above is (car-1, person-9, building-2).

At block 312, the method 300 may determine a class C based on the aggregated classification scores. For example, the identification component 144 and/or the classification component 146 may determine that, given the aggregated scores of (car-1, person-9, building-2), the classification for the corresponding cluster is a person as described above.

At block 314, the method 300 may generate K class-specific descriptors of class C with complexity $C_L$. For example, the identification component 144 and/or the classification component 146 may generate class-specific descriptors of the person class with complexity $C_L$ as described above.

At block 316, the method 300 may inject the K class-specific descriptors of complexity $C_L$ into the database. For example, the identification component 144 may apply the class-specific descriptors of complexity $C_L$ (e.g., $C_1$ for 1 level, $C_2$ for 2 levels, etc.) on the surveillance videos and/or images 112 in the server 140 or the data repository 150 as described above.

Figure 4:
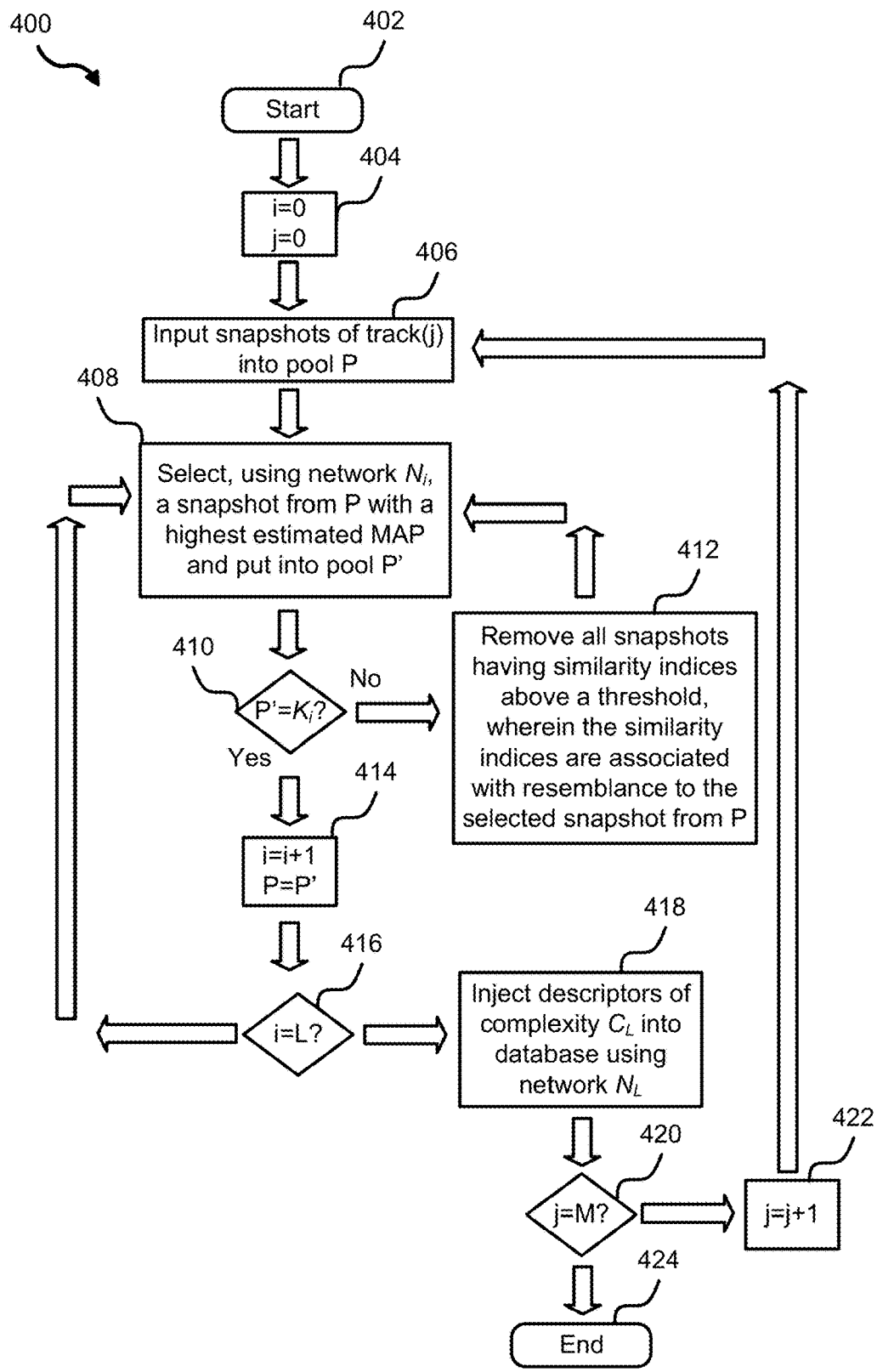
FIG. 4 illustrates an example of a method for implementing the hierarchical sampling for re-identification process using neural networks in accordance with aspects of the present disclosure.

Turning now to FIG. 4, an example of a method 400 for performing hierarchical sampling using neural networks for re-identification may be performed by the server 140 and one or more of the communication component 142 and/or the identification component 144.

At block 402, the method 400 may start the hierarchical sampling for re-identification process as described above.

At block 404, the method 400 may set the counters i and j to 0. The counter i may represent the number of iterations of selecting descriptors and clustering snapshots. The counter j may represent the number of tracks (e.g., groups of videos and/or images). For example, the identification component 144 of the server 140 receiving surveillance videos and/or image from nine cameras of the plurality of cameras 110 may have a j value of "9" (1 track from each camera) as described above.

At block 406, the method 400 may input snapshots of track (i) into a pool P. For example, the identification component 144 may input a portion of the surveillance videos and/or images 112 into a pool P as described above.

At block 408, the method 400 may select, using a network $N_i$, snapshots from the pool P with the highest estimated mean average precisions (MAPs) and put into a pool P'. For example, the AI component 148 may use a neural network $N_i$ to select snapshots having the highest MAP for re-identification purpose. In one example, the AI component 148 may use regression as a fast proxy as described above. The AI component 148 may train a "regression model" that estimates the MAP by examining a snapshot. The snapshot with the highest MAPs may be snapshots with the highest qualities for re-identification (e.g., good illumination, high level of details, good alignment and/or orientation).

At block 410, the method 400 may determine whether P'=$K_i$, where $K_i$ is a predetermined number associated with the number of clusters. If the identification component 144 determines that P'≠$K_i$, the identification component 144 may proceed to block 412 as described above.

At block 412, the method 400 may remove all snapshots having similarity indices above a threshold, wherein the similarity indices are associated with resemblance to the selected snapshot from P. For example, the identification component 144 may remove all snapshots having similarity indices above a threshold, wherein the similarity indices are associated with resemblance to the selected snapshot from P as described above. In a non-limiting example, two images that look "similar" (e.g., same people/object, same background, taken within half of a second from each other, etc.) may have high similarity indices.

Next, the method 400 may iteratively perform some or all of the steps between blocks 406 and 412 until, at block 410, the identification component 144 of the server 140 determines that P'=$K_i$. If the identification component 144 of the server 140 determines that P'=$K_i$, then the identification component 144 may move onto block 414.

At block 414, the identification component 144 of the server 140 may increment the counter i by one and set the pool P to be equal to the pool P'. For example, the identification component 144 may increment the counter i and set the pool P to P'.

At block 416, the method 200 may determine if i=L, where L is the number of levels of complexities. If the identification component 144 of the server 140 determines that i<L, then the identification component 144 may move back to block 408 again.

In some implementations, the method 400 may iteratively perform some or all of the steps between blocks 408 and 416 until, at block 416, the identification component 144 of the server 140 determines that i=L. If the identification component 144 of the server 140 determines that i=L, then the identification component 144 may move onto block 418.

At block 418, the method 400 may inject the descriptors of complexity $C_L$ into a database, such as the data repository 150, using the neural network $N_L$. For example, the identification component 144 may apply the descriptors of complexity $C_L$ (e.g., $C_1$ for one level, $C_2$ for two levels, etc.) on the surveillance videos and/or images 112 in the server 140 or the data repository 150 using the neural network trained at block 408 as described above.

At block 420, the method 400 may determine if j=M, where M is the number of tracks. If the identification component 144 of the server 140 determines that j<M, then the identification component 144 may move onto block 422.

At block 422, the method 400 may increment the counter j by one. For example, the identification component 144 may increment the counter j by one as described above.

In some implementations, the method 400 may iteratively perform some or all of the steps between blocks 406 and 422 until, at block 422, the identification component 144 of the server 140 determines that j=M. If the identification component 144 of the server 140 determines that j=M, then the identification component 144 may move onto block 424 to terminate the method 400.

Figure 5:
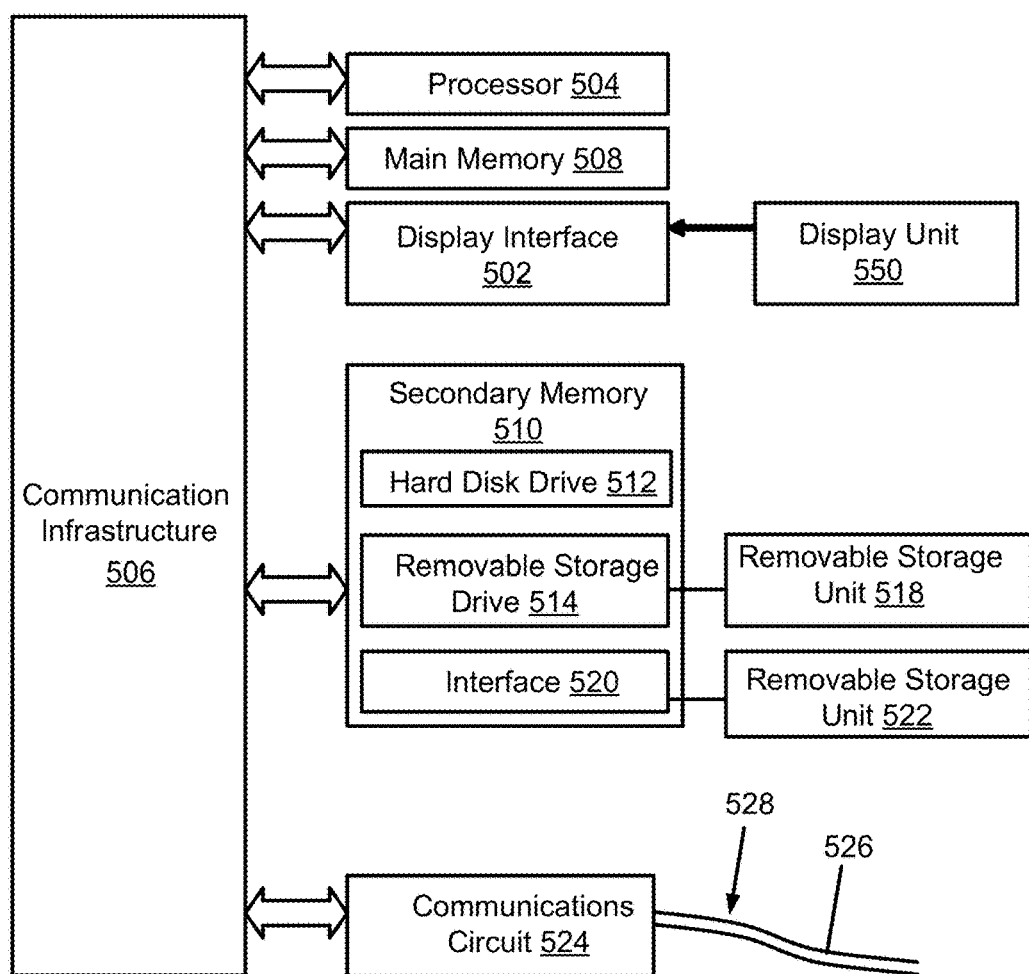
FIG. 5 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 500 is shown in FIG. 5. In some examples, the server 140 may be implemented as the computer system 500 shown in FIG. 5. The server 140 may include some or all of the components of the computer system 500.

The computer system 500 includes one or more processors, such as processor 504. The processor 504 is connected with a communication infrastructure 506 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 500 may include a display interface 502 that forwards graphics, text, and other data from the communication infrastructure 506 (or from a frame buffer not shown) for display on a display unit 550. Computer system 500 also includes a main memory 508, preferably random access memory (RAM), and may also include a secondary memory 510. The secondary memory 510 may include, for example, a hard disk drive 512, and/or a removable storage drive 514, representing a floppy disk drive, a magnetic tape drive, an optical disk drive, a universal serial bus (USB) flash drive, etc. The removable storage drive 514 reads from and/or writes to a removable storage unit 518 in a well-known manner. Removable storage unit 518 represents a floppy disk, magnetic tape, optical disk, USB flash drive etc., which is read by and written to removable storage drive 514. As will be appreciated, the removable storage unit 518 includes a computer usable storage medium having stored therein computer software and/or data. In some examples, one or more of the main memory 508, the secondary memory 510, the removable storage unit 518, and/or the removable storage unit 522 may be a non-transitory memory.

Alternative aspects of the present disclosures may include secondary memory 510 and may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications circuit 524. The communications circuit 524 may allow software and data to be transferred between computer system 500 and external devices. Examples of the communications circuit 524 may include a modem, a network interface (such as an Ethernet card), a communications port, a Personal Computer Memory Card International Association (PCMCIA) slot and card, etc. Software and data transferred via the communications circuit 524 are in the form of signals 528, which may be electronic, electromagnetic, optical or other signals capable of being received by the communications circuit 524. These signals 528 are provided to the communications circuit 524 via a communications path (e.g., channel) 526. This path 526 carries signals 528 and may be implemented using wire or cable, fiber optics, a telephone line, a cellular link, an RF link and/or other communications channels. In this document, the terms "computer program medium" and "computer usable medium" are used to refer generally to media such as the removable storage unit 518, a hard disk installed in hard disk drive 512, and signals 528. These computer program products provide software to the computer system 500. Aspects of the present disclosures are directed to such computer program products.

Computer programs (also referred to as computer control logic) are stored in main memory 508 and/or secondary memory 510. Computer programs may also be received via communications circuit 524. Such computer programs, when executed, enable the computer system 500 to perform the features in accordance with aspects of the present disclosures, as discussed herein. In particular, the computer programs, when executed, enable the processor 504 to perform the features in accordance with aspects of the present disclosures. Accordingly, such computer programs represent controllers of the computer system 500.

In an aspect of the present disclosures where the method is implemented using software, the software may be stored in a computer program product and loaded into computer system 500 using removable storage drive 514, hard drive 512, or communications interface 520. The control logic (software), when executed by the processor 504, causes the processor 504 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of hierarchical sampling, comprising:
   receiving a first plurality of snapshots;
   generating a first plurality of descriptors each associated with the first plurality of snapshots;
   grouping the first plurality of snapshots into at least one cluster based on the plurality of descriptors;
   selecting a representative snapshot for each of the at least one cluster;
   generating at least one second descriptor for the representative snapshot for each of the at least one cluster, wherein the at least one second descriptor is more complex than the first plurality of descriptors; and
   identifying a target by applying the at least second descriptor to a second plurality of snapshots.

2. The method of claim 1, further comprising, prior to receiving the first plurality of snapshots:
   receiving a third plurality of snapshots;
   generating a third plurality of descriptors each associated with the third plurality of snapshots, wherein the third plurality of descriptors are less complex than the first plurality of descriptors;
   grouping the third plurality of snapshots into a plurality of clusters based on the third plurality of descriptors; and
   selecting a second plurality of representative snapshots as the first plurality of snapshots.

3. The method of claim 1, further comprising receiving a plurality of tracks, wherein the first plurality of snapshots is from one of the plurality of tracks.

4. The method of claim 1, further comprising:
   classifying the representative snapshot for each of the at least one cluster;
   aggregating classification scores of the representative snapshot for each of the at least one cluster;
   determining a class based on the aggregated classification scores; and
   wherein the at least one descriptor is a class-specific descriptor.

5. The method of claim 1, further comprising, prior to selecting the representative snapshot, estimating a mean average precision (MAP) for each snapshot in the at least one cluster.

6. The method of claim 5, wherein selecting the representative snapshot for each of the at least one cluster comprises selecting a snapshot in the at least one cluster having a highest estimated MAP.

7. The method of claim 6, further comprising:
   computing similarity indices of remaining snapshots in the at least one cluster; and
   removing a subset of snapshots in the at least one cluster having similarity indices exceeding a predetermined threshold.

8. The method of claim 5, wherein estimating a MAP comprises using a neural network to estimate the MAP.

9. A non-transitory computer readable medium comprising instructions stored therein that, when executed by a processor of a system, cause the processor to:
   receive a first plurality of snapshots;
   generate a first plurality of descriptors each associated with the first plurality of snapshots;
   group the first plurality of snapshots into at least one cluster based on the plurality of descriptors;
   select a representative snapshot for each of the at least one cluster;
   generate at least one second descriptor for the representative snapshot for each of the at least one cluster, wherein the at least one second descriptor is more complex than the first plurality of descriptors; and
   identify a target by applying the at least second descriptor to a second plurality of snapshots.

10. The non-transitory computer readable medium of claim 9, further comprising instructions stored therein that, when executed by the processor of the system, cause the processor to, prior to receiving the first plurality of snapshots:
    receive a third plurality of snapshots;
    generate a third plurality of descriptors each associated with the third plurality of snapshots, wherein the third plurality of descriptors are less complex than the first plurality of descriptors;
    group the third plurality of snapshots into a plurality of clusters based on the third plurality of descriptors; and
    select a second plurality of representative snapshots as the first plurality of snapshots.

11. The non-transitory computer readable medium of claim 9, further comprising instructions stored therein that, when executed by the processor of the system, cause the processor to receive a plurality of tracks, wherein the first plurality of snapshots is from one of the plurality of tracks.

12. The non-transitory computer readable medium of claim 9, further comprising instructions stored therein that, when executed by the processor of the system, cause the processor to:
    classify the representative snapshot for each of the at least one cluster;
    aggregate classification scores of the representative snapshot for each of the at least one cluster;
    determine a class based on the aggregated classification scores; and
    wherein the at least one descriptor is a class-specific descriptor.

13. The non-transitory computer readable medium of claim 9, further comprising instructions stored therein that, when executed by the processor of the system, cause the processor to, prior to select the representative snapshot, estimate a Mean Average Precision for each snapshot in the at least one cluster.

14. The non-transitory computer readable medium of claim 13, wherein the instructions for selecting the representative snapshot for each of the at least one cluster comprises instructions that, when executed by the processor of the system, cause the processor to select a snapshot in the at least one cluster having a highest estimated mean average precision (MAP).

15. The non-transitory computer readable medium of claim 14, further comprising instructions stored therein that, when executed by the processor of the system, cause the processor to:

compute similarity indices of remaining snapshots in the at least one cluster; and remove a subset of snapshots in the at least one cluster having similarity indices exceeding a predetermined threshold.

16. The non-transitory computer readable medium of claim 13, wherein the instructions for estimating a MAP comprises instructions that, when executed by the processor of the system, cause the processor to use a neural network to estimate the MAP.

17. A system, comprising:
memory that stores instructions; and
a processor configured to execute the instructions to:
receive a first plurality of snapshots;
generate a first plurality of descriptors each associated with the first plurality of snapshots;
group the first plurality of snapshots into at least one cluster based on the plurality of descriptors;
select a representative snapshot for each of the at least one cluster;
generate at least one second descriptor for the representative snapshot for each of the at least one cluster, wherein the at least one second descriptor is more complex than the first plurality of descriptors; and
identify a target by applying the at least second descriptor to a second plurality of snapshots.

18. The system of claim 17, wherein the processor is further configured to execute the instructions to, prior to receiving the first plurality of snapshots:
receive a third plurality of snapshots;
generate a third plurality of descriptors each associated with the third plurality of snapshots, wherein the third plurality of descriptors are less complex than the first plurality of descriptors;
group the third plurality of snapshots into a plurality of clusters based on the third plurality of descriptors; and
select a second plurality of representative snapshots as the first plurality of snapshots.

19. The system of claim 17, wherein the processor is further configured to execute the instructions to receive a plurality of tracks, wherein the first plurality of snapshots is from one of the plurality of tracks.

20. The system of claim 17, wherein the processor is further configured to execute the instructions to:
classify the representative snapshot for each of the at least one cluster;
aggregate classification scores of the representative snapshot for each of the at least one cluster;
determine a class based on the aggregated classification scores; and
wherein the at least one descriptor is a class-specific descriptor.

* * * * *